United States Patent
Remillard et al.

(10) Patent No.: US 12,457,937 B2
(45) Date of Patent: Nov. 4, 2025

(54) CROP HARVESTING HEADER WITH VARIABLE DIAMETER REEL

(71) Applicant: MACDON INDUSTRIES LTD., Winnipeg (CA)

(72) Inventors: Rheal Remillard, St. Joseph (CA); Bruce Robert Shearer, Winnipeg (CA)

(73) Assignee: MACDON INDUSTRIES LTD., Winnipeg (CA)

( * ) Notice: Subject to any disclaimer, the term of this patent is extended or adjusted under 35 U.S.C. 154(b) by 423 days.

(21) Appl. No.: 17/766,278

(22) PCT Filed: Oct. 2, 2020

(86) PCT No.: PCT/CA2020/051323
§ 371 (c)(1),
(2) Date: Apr. 4, 2022

(87) PCT Pub. No.: WO2021/062552
PCT Pub. Date: Apr. 8, 2021

(65) Prior Publication Data
US 2024/0049644 A1    Feb. 15, 2024

Related U.S. Application Data

(60) Provisional application No. 62/909,462, filed on Oct. 2, 2019.

(51) Int. Cl.
*A01D 57/03* (2006.01)
*A01D 34/04* (2006.01)
(Continued)

(52) U.S. Cl.
CPC .............. *A01D 57/04* (2013.01); *A01D 34/04* (2013.01); *A01D 34/283* (2013.01); *A01D 57/03* (2013.01)

(58) Field of Classification Search
CPC ...... A01D 34/28; A01D 34/289; A01D 34/04; A01D 34/283; A01D 57/00; A01D 57/01;
(Continued)

(56) References Cited

U.S. PATENT DOCUMENTS 4,124,970 A * 11/1978 Bernhardt .............. A01D 57/04
56/DIG. 15
4,204,383 A * 5/1980 Milliken, Jr. .......... A01D 57/00
56/DIG. 15

(Continued)

FOREIGN PATENT DOCUMENTS

| EP | 2147590 | 1/2010 |
| WO | 2014100105 | 6/2014 |
| WO | 2019046930 | 3/2019 |

*Primary Examiner* — Adam J Behrens
(74) *Attorney, Agent, or Firm* — Miller Canfield

(57) ABSTRACT

A reel of a harvester including a cutter bar includes a plurality of reel bats which are pivotal so as to vary the angle of the fingers about the bat axis as the reel rotates. The reel is used with a cutter bar which can change in height at one or more positions along its length to accommodate changes in ground height and contour. In order to maintain the fingers of the reel as close as possible to the cutter bar for best crop control, there is provided a sensor at each of one or more positions along the cutter bar responsive to the cutter bar height and an actuator which changes the diameter of the reel bats at the respective position.

18 Claims, 6 Drawing Sheets

(51) Int. Cl.
*A01D 34/28* (2006.01)
*A01D 57/04* (2006.01)

(58) Field of Classification Search
CPC ...... A01D 57/02; A01D 57/025; A01D 57/04; A01D 57/03
See application file for complete search history.

(56) References Cited

U.S. PATENT DOCUMENTS

| | | |
|---|---|---|
| 6,591,598 B2 | 7/2003 | Remillard et al. |
| 10,595,462 B2 * | 3/2020 | Hunt .................... A01D 41/141 |
| 12,004,453 B2 * | 6/2024 | Sudhues .............. A01D 41/148 |
| 12,108,704 B2 * | 10/2024 | Yanke ................. A01D 41/144 |
| 2007/0204583 A1 * | 9/2007 | Coers .................. A01D 61/002 56/14.4 |
| 2008/0022647 A1 * | 1/2008 | Jones .................... A01D 57/03 56/220 |
| 2009/0107094 A1 * | 4/2009 | Bich .................... A01D 41/141 56/10.2 E |
| 2015/0272003 A1 * | 10/2015 | Honey .................. A01D 57/03 56/181 |
| 2019/0003496 A1 * | 1/2019 | Hunt ...................... A01B 63/10 |
| 2019/0082601 A1 * | 3/2019 | Honey .................. A01D 57/12 |
| 2019/0124842 A1 * | 5/2019 | Ricketts ................ A01D 57/03 |

* cited by examiner

CROP HARVESTING HEADER WITH VARIABLE DIAMETER REEL

CROSS-REFERENCE TO RELATED APPLICATIONS

This application claims priority to U.S. Provisional Application No. 62/909,462, filed on Oct. 2, 2019, which is hereby incorporated by reference in its entirety.

BACKGROUND OF THE INVENTION

Field of the Invention

The present invention relates to a crop harvesting header for harvesting agricultural crops and having a variable diameter reel.

Description of Related Art

Headers for harvesting agricultural crops are known in the art. Typical headers include a header frame with side wing sections that pivot upwardly and downwardly to contour to a field as the header is moved across the field for harvesting crops. At least one crop pick-up reel is coupled to the header frame to engage the crops to be harvested, and a cutter bar operatively extends across a front portion of the header frame to cut the crops to be harvested.

For example, U.S. Pat. No. 6,591,598 (Remillard), assigned to the present Applicant and the disclosure of which is incorporated by reference herein, discloses a crop harvesting header including a cutter bar and a reel for controlling movement of the crop in the area over the cutter bar. The reel is rotatable about an axis generally parallel to the cutter bar and has a plurality of reel bats each having reel fingers projecting generally radially outwardly therefrom. The reel bats are pivotal each about a respective bat axis parallel to the reel axis so as to vary the angle of the fingers about the bat axis as the reel rotates. The reel co-operates with a cam carried on reel support arms in a generally stationary position so that each bat has a crank arm with a cam follower on the crank arm which follows the cam as the reel rotates relative to the cam and causes the required pivotal movement of the bat.

It is advantageous for the fingers of the crop pick-up reel to be positioned as close to the cutter bar as possible for optimal harvesting efficiency. However, when positioned close to the cutter bar, the fingers can inadvertently contact the cutter bar when the side wing sections of the header frame pivot in response to terrain changes in the field. Typically, controlling the position of the reel to the cutter bar is provided by raising and lowering the whole reel as required or by providing multiple reels which can be individually controlled. Headers will often include additional crop pick-up reels or will limit pivoting of the side wing sections to limit the inadvertent contact of the reel fingers with the cutter, however, this results in a potentially heavier, costlier, and less efficient product.

SUMMARY OF THE INVENTION

According to one aspect of the invention, a header is provided for harvesting agricultural crops comprising a header frame arranged for movement in a direction of working movement across ground carrying a crop to be harvested. A cutter bar is arranged across a forward edge of the header frame structure for cutting the crop. A cut crop transport arrangement is mounted on the header frame structure for receiving and transporting the cut crop for further processing. A reel is provided for controlling movement of the crop in the area over the cutter bar. The reel is mounted on the header frame structure for movement therewith in the direction of movement and for rotation about a reel axis generally parallel to the cutter bar. The reel has a plurality of reel bats at spaced positions around the reel axis so that as the reel rotates, the reel bats pass over the cutter bar for carrying crop rearwardly from the cutter bar. Each reel bat has a row of bat fingers projecting generally outwardly from the bat axis with the bat fingers of the row being arranged at longitudinally spaced positions along the bat axis. The reel is mounted on support arms connected to the header frame for raising and lowering the reel axis so as to change a distance of the bat fingers from the cutter bar at a point of closest approach of the bat fingers to the cutter bar as the bat fingers pass over the cutter bar. At least one actuation linkage is mounted on the reel at an axial location of the reel. The actuation linkage is operable to increase and decrease a radial distance from the axis of the reel of a portion of the reel bats at the axial location relative to at least one portion of the reel bats spaced from the axial location.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
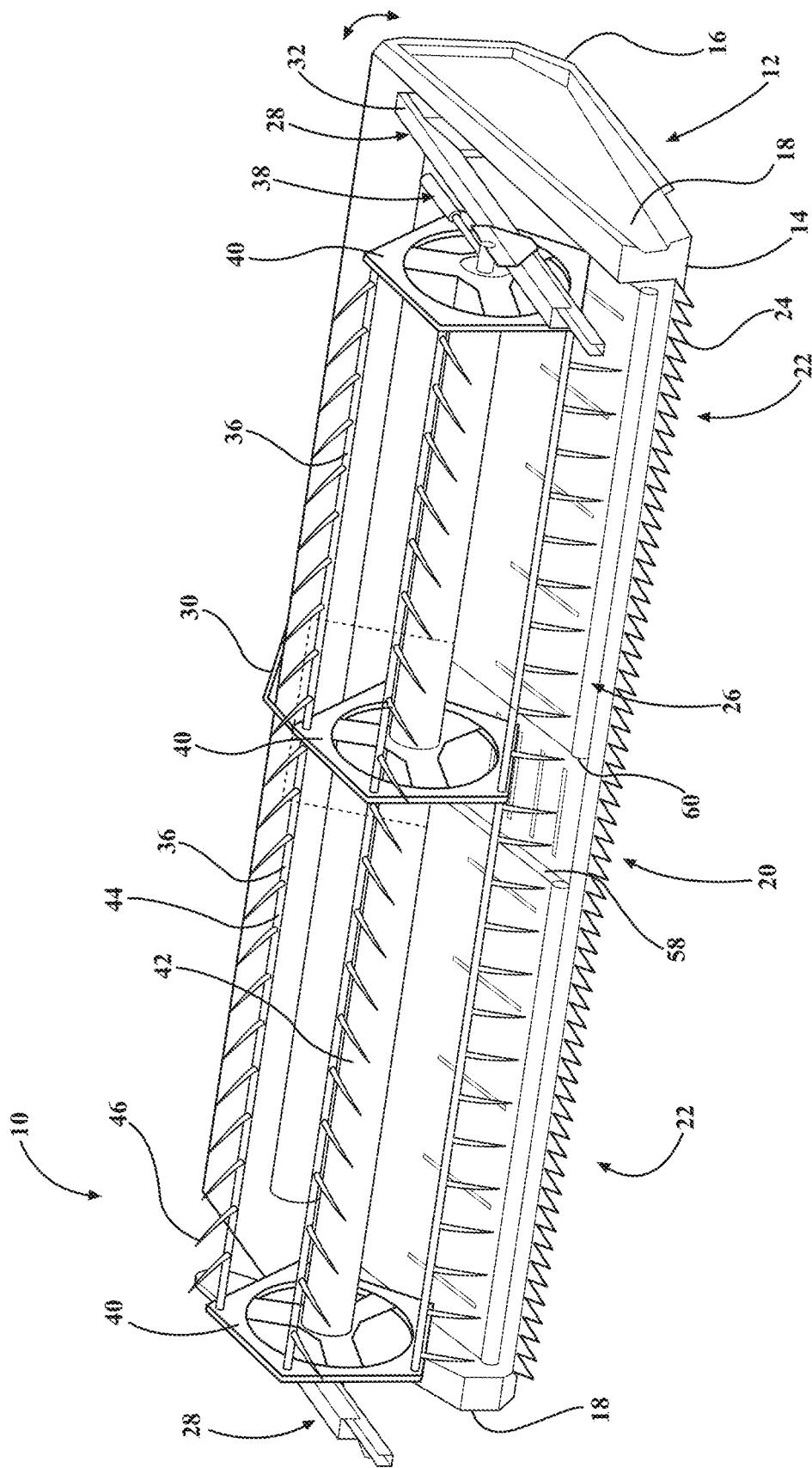
FIG. 1 is a perspective view of a header where the header frame is formed as a three-piece header with side wings and having multiple crop pick-up reels.

Referring to the Figures, wherein like numerals indicate like or corresponding parts throughout the several views, a header for harvesting agricultural crops is shown generally at 10. In FIGS. 1-4, various embodiments of a header 10 according to the present invention are shown with a number of the elements being shown schematically since the general construction of such header elements is well known to one skilled in the art. The header 10 includes a header frame 12 with a front portion 14 and a rear portion 16 extending laterally between opposite ends 18. The header frame 12 is divided into a middle frame section 20 pivotally coupled between a pair of side wing sections 22. The side wing sections 22 are pivotable upwardly and downwardly relative to the middle frame section 20 to contour to a field as the header 10 is moved across the field for harvesting crops. A cutter bar assembly 24 operatively extends across the front portion 14 of the header frame 12 for cutting the crops to be harvested. The header 10 may further include a draper belt assembly 26 rotatably supported by the header frame 12 for transporting harvested agricultural crops from the draper header 10, generally for further processing by an agricultural machine such as a combine or for creation of windrows by a swather. Alternatively, the header 10 may include an auger assembly rotatably supported by the header frame 12 for transporting the harvested crops from the header 10 to the combine as is known to one skilled in the art without varying from the scope of the present invention.

Figure 2:
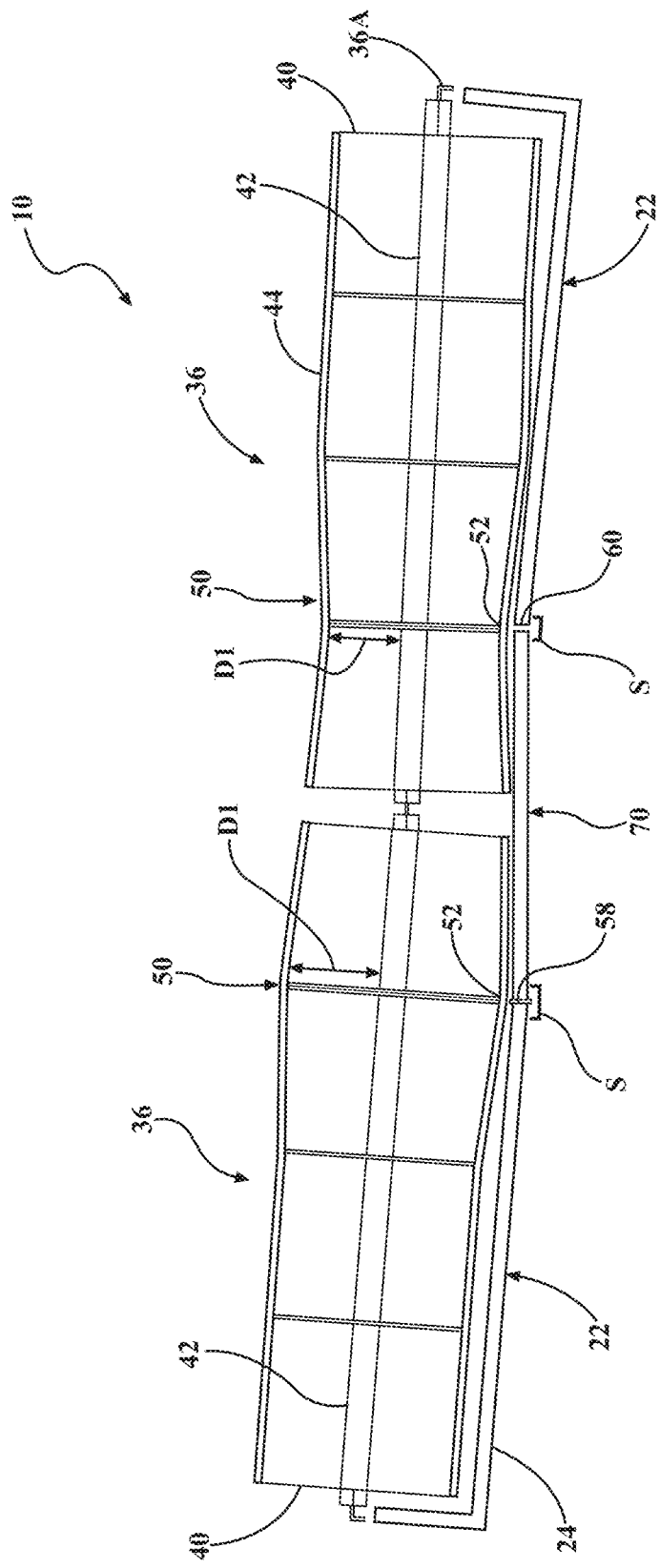
FIG. 2 is a schematic front elevational view of the header of FIG. 1 where the frame is formed as a three-piece header with the cutter bar otherwise being rigid.
Figure 3:
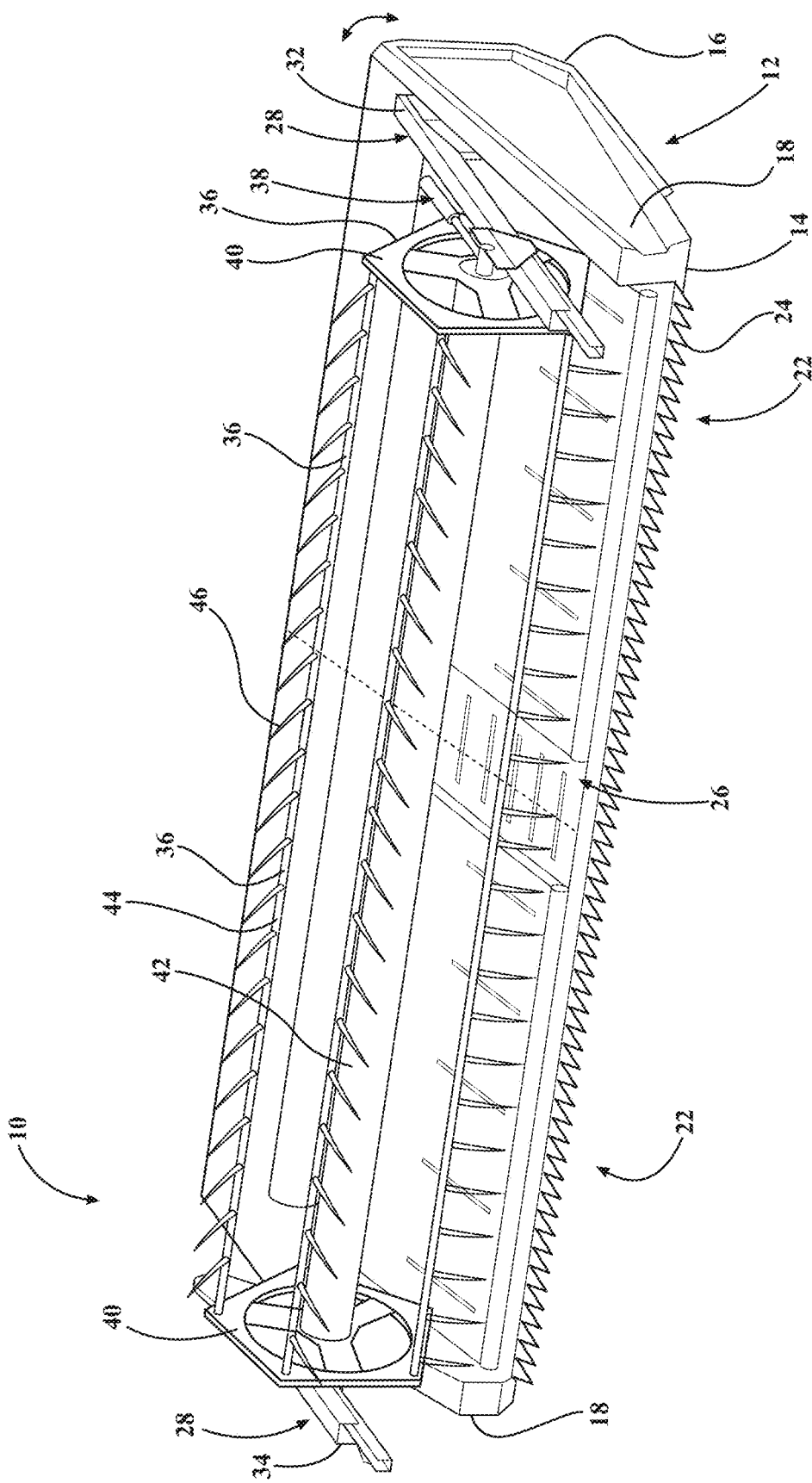
FIG. 3 is a perspective view of a header having as single crop pick-up reel extending along the length of the frame and cutter bar.
Figure 4:
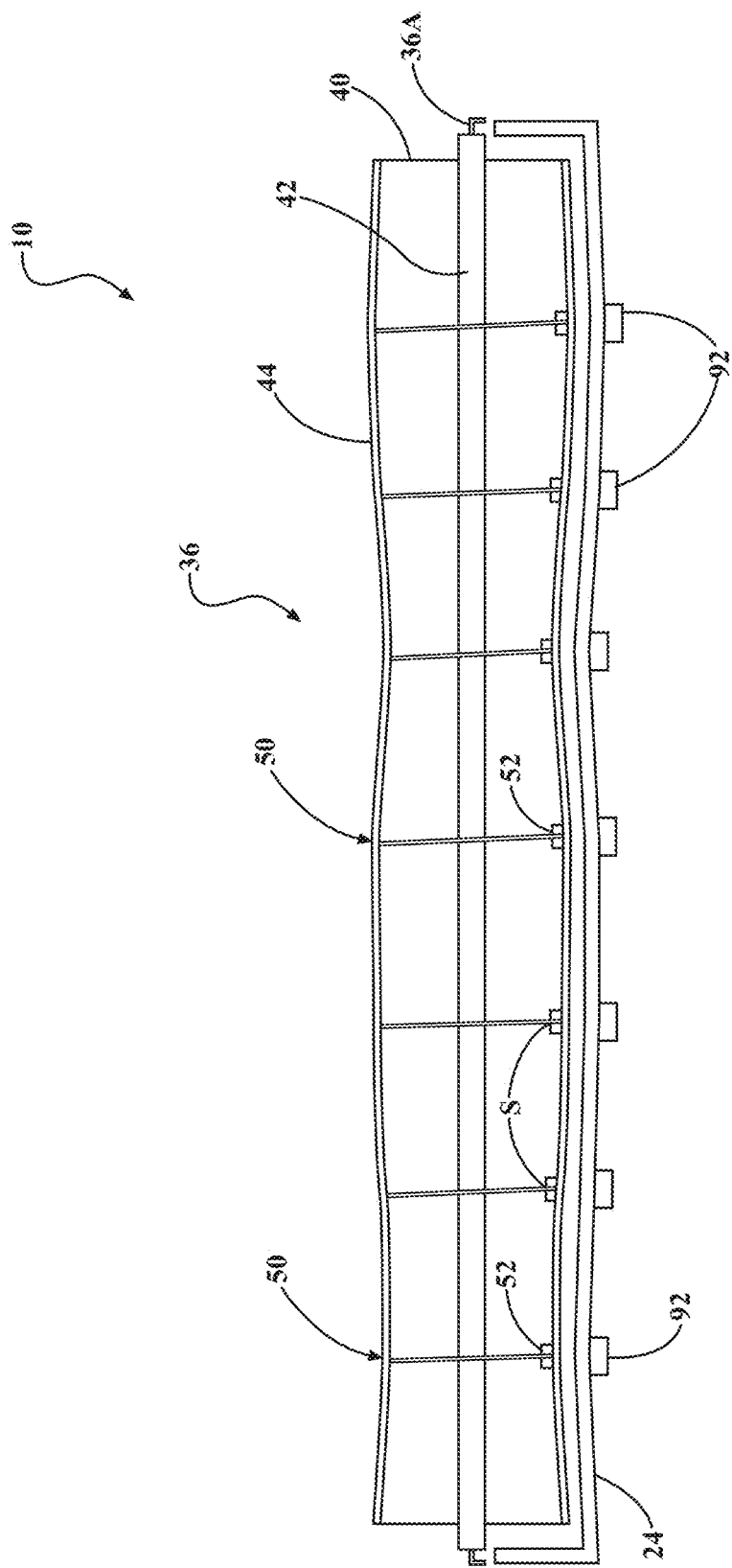
FIG. 4 is a schematic front elevational view of the header of FIG. 3 where the cutter bar is flexible along its length.

Referring to FIGS. 1 and 2, the header 10 further includes an outer reel support arm 28 disposed adjacent each end 18 of the header frame 12, and a center reel support arm 30 spaced generally equidistant therebetween. The outer and center reel support arms 28, 30 each extend between a proximal end 32 coupled to the rear portion 16 of the header frame 12 and an opposite distal end 34 spaced above the front portion 14 of the header frame 12. A pair of crop pick-up reels 36 are rotatably coupled between the center reel support arm 30 and the outer reel support arms 28 for engaging the crops to be harvested. The outer and center reel support arms 28, 30 are adjustable upwardly and downwardly via a hydraulic actuator, shown generally at 38 to vertically position the crop pick-up reels 36 relative to the cutter bar assembly 24. It is to be appreciated that the header may have any number or arrangement of frame sections, reel support arms, and crop pick-up reels without varying the scope of the invention. For example, as shown in FIGS. 3 and 4, the header 10 may alternatively include a pair of side wing sections 22 and a single crop pick-up reel 36 rotatably coupled between a pair of support arms 28 positioned adjacent the ends 18 of the header frame 12 and extending the entire length of the header frame 12.

Each side wing section 22 of the header frame 12 is pivotally and operatively coupled to the middle frame section 20 by a first wing pivot 58 and a second wing pivot 60. The first and second wing pivots 58, 60 allow the side wing sections 22 to pivot upwardly and downwardly relative to the middle frame section 20. A wing sensing system, shown generally as a sensor at S, may be mounted to each wing section 22 to sense pivoting of the side wing sections 22 relative to the middle frame section 20. It is to be appreciated that any suitable wing sensing system may be used to sense pivoting of the side wing sections without varying the scope of the invention, including placement of the wing sensing system elsewhere on the header. Additionally, it is contemplated that the wing sensing system may also include the capability to sense a speed at which the side wing sections 22 are pivoting relative to the middle frame section 20. Further, it is contemplated that the header 10 may include a reel height position sensor to monitor positioning of the crop pick-up reels 36 relative to the cutter bar assembly 24.

Each crop pick-up reel 36 further includes an end support discs 40 disposed and mounted at opposing ends of an elongated reel tube 42 which supports the discs 40 for rotation about an axis 36A of the reel 36. The discs 40 support a plurality of longitudinal reel bats 44, or tine tubes, at angularly spaced positions around the axis 36A defining a common bat circle 44C around the reel axis 36A so that rotation of the reel 36 causes the reel bats 44 to follow a path of movement lying on the bat circle 44C. Each reel bat 44 carries a plurality of longitudinally spaced fingers 46 which project outwardly from the bats 44 for engaging the crop. Each reel bat 44 is pivotal about its own individual axis 44A parallel to the reel axis 36A so as to change the angular position of the fingers around the axis 44A of the bat 44. The angular position of the bat 44 about its axis 44A may be controlled by a linkage which cooperates with a cam so that as the reel 36 rotate the linkage moves the bats 44 to the required angular position in dependence upon the co-operation of the linkage with the cam. Arrangements of this general type are well known and conventional as discussed in the prior art U.S. Pat. No. 6,591,598, the disclosure of which is incorporate by reference herein in its entirety.

Referring to FIGS. 1 and 2, the header 10 includes a pair of crop pick-up reels 36 spanning the length of each of the side wing sections 22 which are pivotally operable upwardly and downwardly relative to the middle frame section 20 along the wing pivots 58, 60 and the cutter bar 24 is typically fixed therebetween. Alternatively, in FIGS. 3 and 4, the header 10 includes a single crop pick-up reel 36 spanning the length of the header 10 and the cutter bar 24 is flexible along its length to follow the ground contour. Arrangements of both of these types of headers are well known both in prior patents and in commercially available machines. For example, the cutter bar may be carried on a series of arms connected to the frame at the rear at a pivot point so that the arms can float upwardly and downwardly depending on ground contour. The height of the arms, and thus the position of the cutter bar, is controlled by suitable pressure control hydraulics (not shown) as is well known. In this way, the cutter bar can take up any shape that is required to properly follow ground contour, of course within limits of flexing movement as determined by the geometry of the system.

As previously discussed, it is desirable for the fingers 46 of the crop pick-up reel 36 to be positioned as close to the cutter bar 24 as possible for optimal harvesting efficiency. However, when positioned close to the cutter bar 24, the fingers 46 can inadvertently contact the cutter bar 24 when the side wing sections 22 of the header 10 pivot in response to terrain changes in the field. Additionally, the fingers 46 can also inadvertently contact the cutter bar 24 when the cutter bar 24 flexes along its length in response to contours in the harvested field. Typically, controlling the position of the reel 36 to the cutter bar 24 is provided solely by raising and lowering the crop pick-up reels 36 as required to maintain a space between the fingers 46 and the cutter bar 24. However, this space will vary greatly along the length of the header 10 depending on the position of either the side wing sections 22 or the sections along the length of the flexible cutter bar 24. Therefore, it is desirable to maintain a minimum space between the fingers 46 and the cutter bar 24 along the length of the header 10 depending of the pivotal position of the side wing sections 22 and/or flex in the cutter bar 24.

According to the present invention, there is provided a variable diameter reel 36 in order to control the diameter of the reel 36 at required positions along its length. The reel 36 includes a plurality of actuation linkages 50 at spaced axial locations along the reel 36 with each actuation linkage 50 being operable to increase and decrease the radial distance from the axis 36A of the reel 36 of a portion of the reel bats 44 relative to locations along the reel 36 at least at one other location of the actuation linkages 50. The plurality of actuation linkages 50 are operable at each respective location to increase and decrease a radial distance from the axis 36A of the reel 36 of the portion of the reel bats 44 independently of the other actuation linkages 50 so as to tailor the diameter of the reel 36 at the locations along its length to a desired variable diameter. The actuation linkage 50 is mounted on the reel 36 at one or more axial locations 52 of the reel 36. The actuation linkage 50 is operable to increase and decrease a radial distance D1 from the axis 36A of the reel 36 of a portion of the reel bats 44 at the axial location 52 relative to at least one portion of the reel bats 44 spaced from the axial location 52.

In FIGS. 1 and 2, the header 10 comprises two reels 36 arranged end to end and supported on supporting arms 28, 30 at the ends of the respective reels 36. The header 10 also includes side wing sections 22 pivotally coupled to a middle frame section 20 by wing pivots 58, 60. In this embodiment, each reel 36 includes one actuation linkage 50 operable to increase and decrease a radial distance D1 from the axis 36A of the reel 36 of the portion of the reel bats 44 at the axial locations 52. The actuation linkage 50 is operable so that at that axial location 52 all the reel bats 44 are increased and decreased by a common amount by bending the bats 44 at the location 52.

Figure 5:
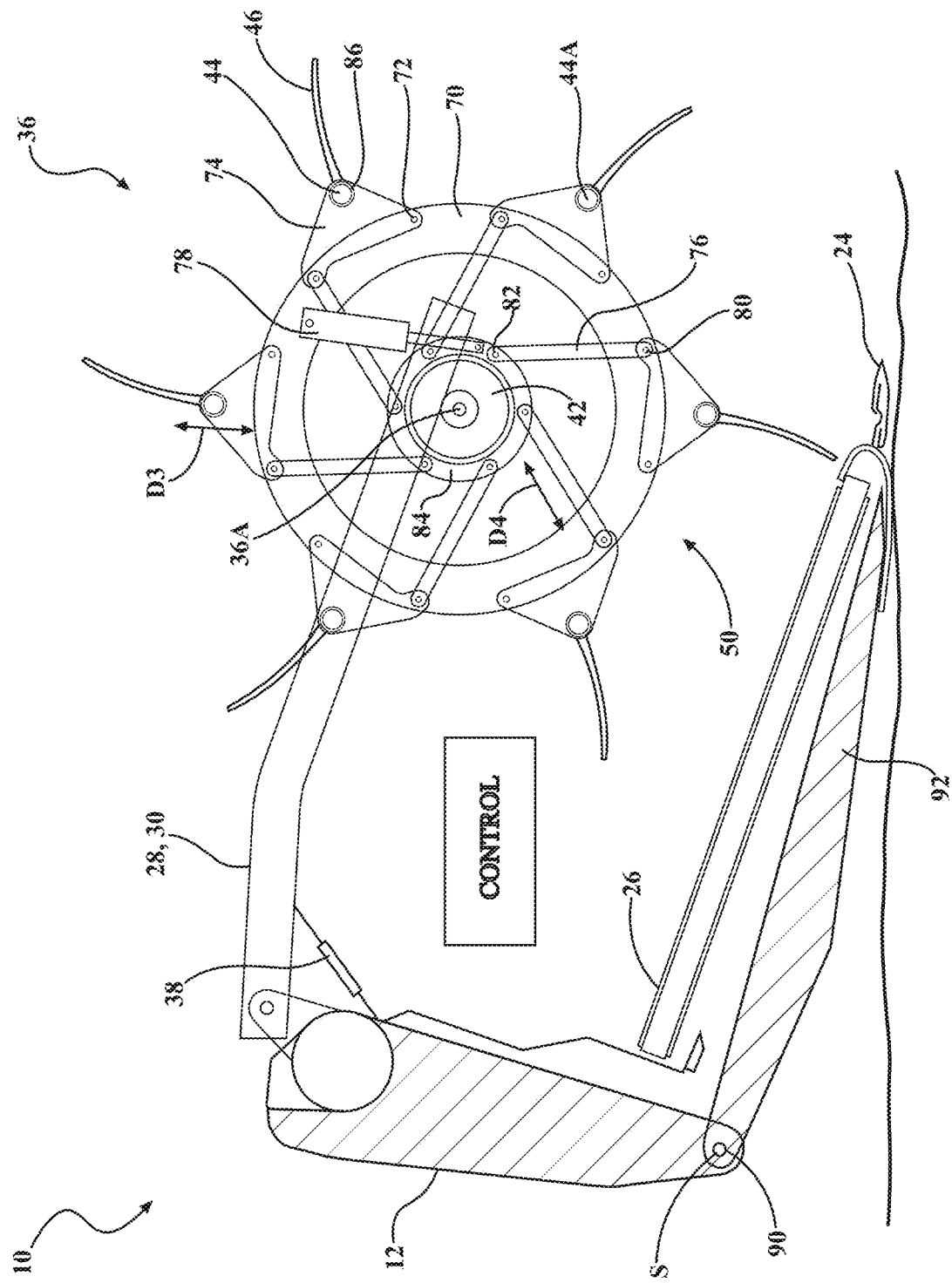
FIG. 5 is a cross-sectional end view of a first embodiment of a variable diameter crop pick-up operatively coupled to a header according to the present invention.

Each actuation linkage 50 according to one embodiment of the invention is shown in FIG. 5 and includes an outer support member in the form of an outer ring 70 located along the length of the reel 36 at the axial location 50 providing a plurality of mounting points 72 at angularly spaced positions around the axis 36A of the reel 36 surrounding the reel tube 42. The actuation linkage 50 further comprises a plurality of pivotal links 74 each attached to the reel bat 44 and pivotally connected to the outer support member 70 at the mounting point 72 on the pivotal link 74 spaced from the reel bat 44 so that pivotal movement of the pivotal link 74 about the mounting point 72 relative to the outer ring 70 causes the reel bat 44 at the pivotal link 74 to move radially inwardly and outwardly as indicated at D3 relative to reel axis 36A.

The pivotal movement of the links 74 is simultaneously actuated by a plurality of operating members or links 76 operated by a common actuator 78 which when actuated move respective ones of the pivotal links 74.

It will be appreciated that many different designs of actuator 78 can be provide at the axial locations 50 to move the reel bats 44 inwardly and outwardly. Also, the power for the actuator 78 can be provided by any power source on the header 10 including electric actuators, hydraulic cylinders and pneumatic cylinders.

The amount of movement of the reel bats 44 inwardly and outwardly can be actuated between maximum and minimum positions. This can be done as simply a selection of one of three positions, including a center position, where the reel bat is straight, between the maximum and minimum positions. Alternatively, the control can use an increased number of positions to be selected or an infinite adjustment. A dead band can also be provided in which no adjustment is made in response to an input.

In the embodiment of FIG. 5, the links 76 which actuate the pivotal movement of the pivot links 74 are provided by elongated push rod members actuated to move inwardly and outwardly relative to the reel axis 36A as indicated at D4.

Many different designs of actuator 78 can be provided to move the links or push rods 76 inwardly and outwardly. In the example shown, the push rods 76 include a first end pivotally attached to the pivot link 74 at pivot 80 and an opposite second end pivotally attached to at pivot 82 to a ring 84 rotatably mounted on the exterior surface of the reel support tube 42 so that rotation of the ring 84 around the exterior surface of the reel support tube 42 acts to push the rods 76 inwardly and outwardly.

Thus, the actuation linkage 50 comprises a plurality of generally triangular reel bat support members 74 carried on the reel 36 at each axial location 50. The members 74 are movable inwardly and outwardly as indicated at D3 relative to the reel axis 36A to provide a bending action on the reel bat 44 at the mounting point on the member 74. Each reel bat support member 74 has a bearing 86 on the outer apex of the support 74 allowing rotation of the reel bat 44 relative to the reel bat support member 74 about the bat axis 44A parallel to the reel axis 36A.

As shown in FIGS. 3 and 4, the cutter bar 24 is deformable along its length so as to change a height of the cutter bar at least at one location along it length to accommodate changes in ground height or contour. In FIG. 4, the whole of the cutter bar is deformable and is carried on arms which can move upwardly and downwardly to accommodate that movement. In order to control the movement, there is provided a sensor S at each support arm arranged to detect the height of the cutter bar 24 at the respective location and to supply the signal to a control device C which controls the actuating linkage 50 which is operated in response to the signal from the sensor S. In FIG. 5, the sensor S is an angle sensor at the pivot 90 of the cutter bar support arm 92 since the arm 92 is directly responsive to the height of the cutter bar 24 at that arm 92. The sensor S may also be a distance sensor attached to the cutter bar and directly measuring the height of the cutter bar relative to affixed point on the header.

As shown in FIG. 2, the header 10 comprises a plurality of side wing sections 22 where each is pivotal about a wing pivot 58, 60 generally longitudinal to a direction of movement at the locations 50. In this embodiment the sensors S are mounted at the longitudinal axis of the pivot points 58, 60 of the header wing sections 22 and can use an angle sensor at the pivot points 58, 60 to provide information about the orientation of the header and thus the height of the cutter bar 24 in the three sections 20, 22. In this embodiment, the cutter bar 24 does not flex between the pivot points 58, 60 so that the cutter bar 24 is deformable only at the longitudinal axis and the sensor S is located only at the longitudinal axis and the cutter bar 24 is unbending apart from at the longitudinal axis.

As shown in FIG. 4, the cutter bar 24 is flexible along its length and there is provided a plurality of locations 50 and a plurality of associated sensors S along the length of the cutter bar 24. That is, the cutter bar 24 is mounted on the support arms 92 connected to the header frame 12 for upward and downward movement of the cutter bar 24 at the arms 92 and the sensors S are provided at locations aligned with the arms 92.

Figure 6:
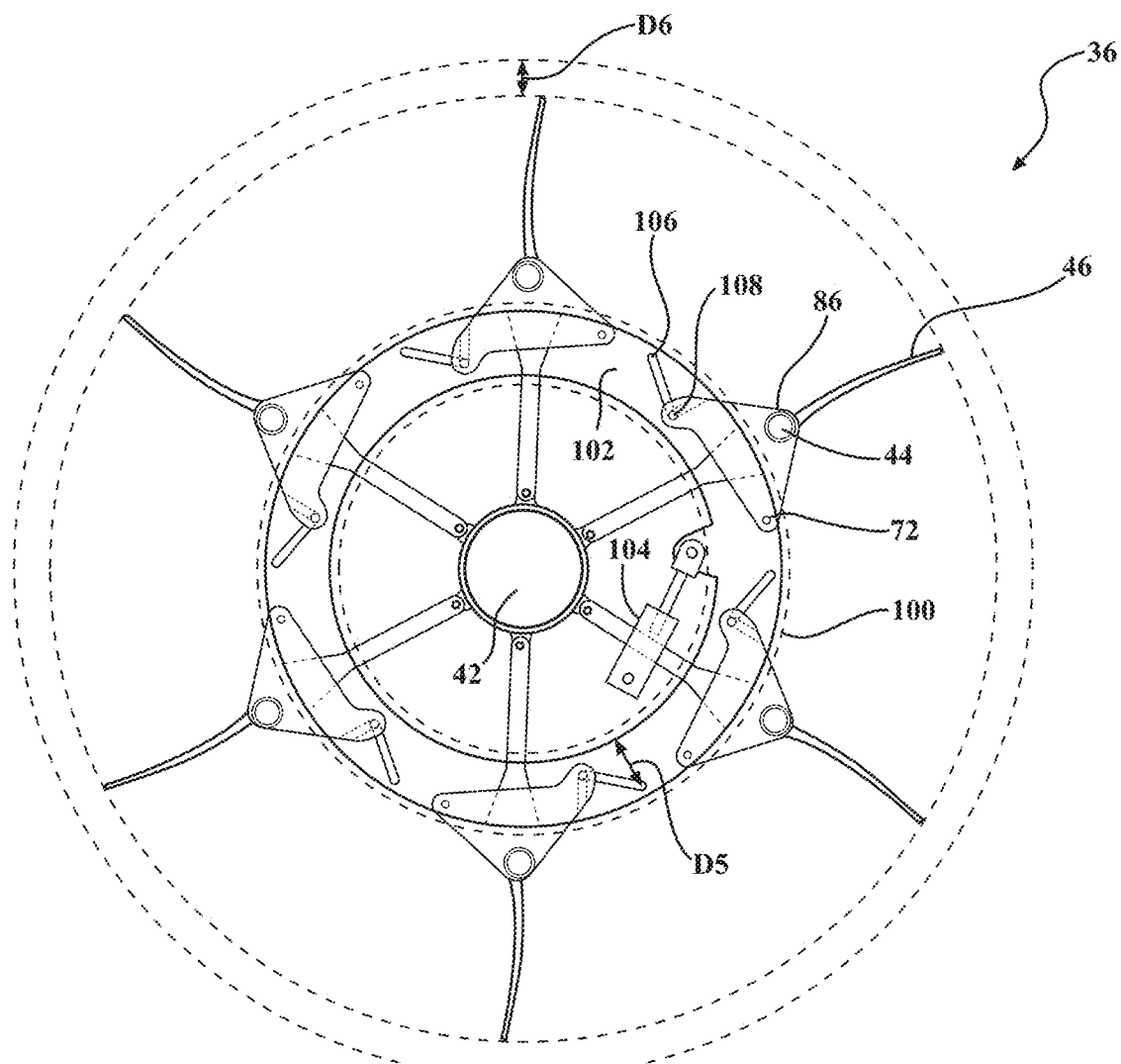
FIG. 6 is a cross-sectional view of the reel only of FIG. 1 showing an alternative arrangement for moving the tine tubes radially inwardly and outwardly.

Referring to FIG. 6, an alternative embodiment of the actuation linkage 50' is shown for moving the reel bats 44, and therefore, the tips of the fingers 46 inwardly and outwardly over the distance D6. In this embodiment, the pivot links 74 are sandwiched between a rotatable first ring 100 and a fixed second ring 102. An actuator 104 is supported by the reel 36 and coupled to the first ring 100 to selectively rotate the first ring 100 in clockwise and counterclockwise directions. The first ring 100 includes a plurality of circumferentially spaced apart angled guide slots 106 projecting radially from the reel axis 36A outwardly towards the bats 44. Each pivot link 74 is pivotal at one end by the pivot pin 72 to the second fixed ring 102. The pivot link 74 includes a follower pin 108 slidably running in the guide slot 106 on the rotating first ring 100 so that the pivot link 74 moves inwardly and outwardly over the distance D5 as the first ring 100 is rotated back and forth thereby flexing the reel bats 44 inwardly and outwardly along the axial location 50.

The control device C can take into account the signals from the sensors S to also control the height of the reel 36 so that both the diameter and height can be controlled in response to a control program to maintain the best position of the fingers 46 relative to the cutter bar 24 across the full length of the cutter bar 24 as the cutter bar 24 moves up and down.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A crop harvesting header comprising:
a header frame arranged for movement in a direction of working movement across ground carrying a crop to be harvested;
a cutter bar arranged across a forward edge of the header frame for cutting the crop;
a cut crop transport arrangement mounted on the header frame for receiving and transporting the cut crop for further processing;
and a reel for controlling movement of the crop in the area over the cutter bar;
the reel being mounted on the header frame for movement therewith in the direction of movement and for rotation about a reel axis generally parallel to the cutter bar;
the reel having a plurality of reel bats at spaced positions around the reel axis so that as the reel rotates, the reel bats pass over the cutter bar for carrying crop rearwardly from the cutter bar;
each reel bat having a row of bat fingers projecting generally outwardly from a bat axis with the bat fingers of the row being arranged at longitudinally spaced positions along the bat axis;
the reel being mounted on support arms connected to the header frame for raising and lowering the reel axis so as to change a distance of the bat fingers from the cutter bar at a point of closest approach of the bat fingers to the cutter bar as the bat fingers pass over the cutter bar;
and at least one actuation linkage mounted on the reel at an axial location of the reel;
the at least one actuation linkage being operable to increase and decrease a radial distance from the axis of the reel of a portion of the reel bats at said axial location relative to at least one other portion of the reel bats spaced from said axial location, wherein a radial distance of the other portion of the reel bats does not increase or decrease.

2. The header according to claim 1 wherein the reel includes a plurality of actuation linkages at spaced axial locations along the reel with each actuation linkage being operable to increase and decrease a radial distance from the axis of the reel of a portion of the reel bats relative to locations along the reel at least at one other of the at least one actuation linkages.

3. The header according to claim 2 wherein each of the plurality of actuation linkages is operable to increase and decrease a radial distance from the axis of said portion of the reel bats independently of said at least one other of the at least one actuation linkages.

4. The header according to claim 3 wherein the reel comprises at least two sections arranged end to end and supported on mounting arms at ends of the sections.

5. The header according to claim 4 wherein each section includes at least one actuation linkage operable to increase and decrease a radial distance from the axis of the reel of a portion of the reel bats at said axial location of said section relative to at least one portion of the reel bats of said section spaced from said axial location.

6. The header according to claim 1 wherein all of the bats at said axial location are increased and decreased by a common amount.

7. The header according to claim 1 wherein the bats are bent at the axial location.

8. The header according to claim 1 wherein the reel includes an outer support member at the axial location providing a plurality of mounting points at angularly spaced positions around the axis of the reel and wherein the at least one actuation linkage comprises:
a plurality of pivotal links each attached to the reel bat and pivotally connected to the outer support member at a position on the pivotal link spaced from the reel bat so that pivotal movement of the pivotal link relative to the outer support member causes the reel bat at the pivotal link to move radially inwardly and outwardly relative to the reel axis;
and a plurality of operating members operated by a common actuator which when actuated move respective ones of the pivotal links.

9. The header according to claim 8 wherein the outer support member comprises a ring.

10. The header according to claim 8 wherein the pivotal links are arranged to pivot about respective axes parallel to the reel axis.

11. The header according to claim 8 wherein the operating members comprise push rod members actuated to move inwardly and outwardly relative to the reel axis.

12. The header according to claim 1 wherein the at least one actuation linkage comprises a plurality of reel bat support members carried on the reel at said at least one location, wherein the members are movable inwardly and outwardly relative to the axis and wherein each reel bat support member has a bearing allowing rotation of the reel bat relative to the reel bat support member about a bat axis parallel to the reel axis.

13. The header according to claim 12 wherein each of the reel bats is pivotal by a drive linkage about its respective bat axis so as to vary the angle of the fingers about the bat axis as the reel rotates.

14. The header according to claim 1 wherein the cutter bar is deformable so as to change a height of the cutter bar at least at one location along it length so as to accommodate changes in ground height, wherein there is provided at least one sensor arranged to detect the height of the cutter bar at said at least one location and wherein the actuating linkage is operated in response to a signal from the sensor.

15. The header according to claim 14 wherein the header frame comprises a plurality of sections each pivotal to the next about an axis generally longitudinal to a direction of movement and wherein the sensor is located at the longitudinal axis.

16. The header according to claim 15 wherein the cutter bar is deformable only at the longitudinal axis and the sensor is located only at the longitudinal axis and the cutter bar is unbending apart from at the longitudinal axis.

17. The header according to claim 14 wherein the cutter bar is flexible along its length and there is provided a plurality of locations and a plurality of associated sensors along the length of the cutter bar.

18. The header according to claim 17 wherein the cutter bar is mounted on arms connected to the header frame for upward and downward movement of the cutter bar at the arms and wherein the sensors are provided at locations aligned with the arms.

* * * * *